3,506,760
METHOD AND COMPOSITION FOR THE
TREATMENT OF NIGHT BLINDNESS
Howard Brod, 17 W. 9th St., New York, N.Y. 10011
No Drawing. Continuation-in-part of application Ser. No.
485,103, Sept. 3, 1965. This application Nov. 24, 1967,
Ser. No. 685,248
Int. Cl. A61k 15/00
U.S. Cl. 424—253                           2 Claims

ABSTRACT OF THE DISCLOSURE

A composition containing an effective amount of caffeine which is about 100 to 200 milligrams and of beta-carotene which is an amount equivalent to between 10,000 and 100,000 International Units of Vitamin A, but preferably 25,000 to 50,000 units, for the treatment and improvement of the condition known as night blindness.

CROSS-REFERENCE TO RELATED APPLICATIONS

This application relates to and is a continuation-in-part of U.S. patent application Ser. No. 485,103, filed Sept. 3, 1965, now abandoned.

BACKGROUND OF THE INVENTION

It is commonly assumed that Vitamin A has several important functions in the body, one of which concerns the ability to see under dim light (commonly called "night vision"). It is generally known that Vitamin A is formed from substances containing carotene and stored in the liver of the human body. It is generally believed that one of the first clinically observable signs of a Vitamin A deficiency is an impairment of night vision, a condition clinically known as nyctalopia or night blindness.

The generally accepted theory of night vision in the human eye holds that carotenoid substances are converted into Vitamin A; that this Vitamin A is stored in the liver; that from this supply in the liver, Vitamin A is released into the bloodstream; that the Vitamin A in the bloodstream is processed in certain cells of the human eye (called "rods"); that this process forms "visual purple" or rhodopsin which is a complex protein substance; and that the rhodopsin so formed is directly utilized for night vision. Indeed, the ability of the eye to become dark adapted has been shown, experimentally, to be directly correlated with the amount of rhodopsin actually present in the "rods" of the eye (these cells being found in large numbers in the periphery of the eye).

Thus, traditionally, it has been held that in the absence of sufficient Vitamin A in the body (due either to a lack of carotene-containing foods in the diet or to the inability of the body to process such foods effectively), insufficient amounts of rhodopsin are produced by the eye, and night vision is thereby impaired. Further, it is known that when rhodopsin is present in the "rods," it is easily destroyed by "bleaching," that is, exposure to bright light, and that rhodopsin must be synthesized or replenished in the dark in order for night vision to be re-established. Therefore, where initial dark adaptation may be adequate and normal, and re-adaptation to the dark may be adequate and normal after exposure to bright light, yet, after repeated exposures to bright light, dark adaptation will generally be impaired even though adequate amounts of Vitamin A can be shown to be still present in the liver, indicative of failure to regenerate rhodopsin by processing the Vitamin A still theoretically available from the liver. Furthermore, it has been shown that impaired night vision occurs rapidly when the diet contains insufficient sources of Vitamin A, even though no other signs of Vitamin A deficiency are present and an ample supply is still to be found in the liver.

Nevertheless, the phenomenon of impaired night vision is generally assumed to be an early indication of Vitamin A deficiency since on theory rhodopsin is formed from Vitamin A. Normal adequate dark adaptation generally takes place within fifteen (15) minutes, during which period the eye is believed to form approximately 90% of the possible rhodopsin that can be formed in the peripheral rod cells of the eye. Where one is suffering from impairment of dark adaptation, the formation of sufficient rhodopsin does not occur during this period even though an amount of Vitamin A is present in the body ample to rule out Vitamin A deficiency as the cause, there being no organic disease present.

Even though Vitamin A is a specific remedy for the treatment of nyctalopia, the condition is not always corrected even where an excess of Vitamin A is administered. Generally the beneficial results of the Vitamin A treatment do not take effect for several days. It is accepted but not clearly understood why the administration of Vitamin A in sufficient quantity will not immediately, or within a relatively short time of less than a day, correct dark adaptation. It is also accepted that where one has normal daylight vision that this fact alone has no relation to whether the same person will also have normal night vision, the two optical systems being separate in the eye.

It is an object of the invention to provide a composition and a method of treatment using the composition which will assist regeneration of "visual purple" or rhodopsin in adults who may work under decreased illumination and who suffer from non-organic impairment of night vision, and thereby treat night blindness.

SUMMARY OF THE INVENTION

The present invention generally contemplates an improved composition for the treatment of night blindness by oral administration to a living being said composition containing caffeine in an amount of about 100 to 200 milligrams together with beta-carotene providing not less than 10,000 International Units of Vitamin A activity, said composition improving the dark adaptation by shortening the time of recovery after dazzling by bright light, which permits seeing in the dark after such dazzling, and by speeding up initial dark adaptation where subnormal dark adaptation is not due to organic disease.

DETAILED DESCRIPTION OF THE INVENTION

When employing my improved composition I have found that the recovery of dark adaptation of the eye is generally accelerated within hours when the combination of caffeine and beta-carotene is orally administered. It is believed that the caffeine is capable of accelerating the process of metabolizing and of utilizing beta-carotene. Although this mechanism is not fully understood, the result provides the "rods" of the eye with sufficient rhodopsin to correct impaired night vision function within hours.

Unexpectedly, this improvement of night vision occurs only where caffeine is employed in the composition containing beta-carotene since relatively large doses of beta-carotene or of Vitamin A are not effective for improvement within hours.

It is possible that caffeine accelerates the metabolic cycle of the beta carotene in the intestine and rapidly makes available to the eye the metabolite is necessary to activates the rods of the retina.

In formulating my improved composition for the treatment of night blindness or nyctalopia, the composition of the invention may take the form of a capsule, tablet or lozenge or may be in a suitable liquid carrier or vehicle. The proportions of the therapeutic agent may vary as well as the proportions of beta carotene admixed therewith. Thus 100 to 200 mg. of caffeine are added to sufficient beta carotene having from 10,000 to 100,000 International Units of Vitamin A activity and preferably 25,000 to 50,000 International Units of Vitamin A activity. The composition may be produced following general procedures in the drug industry for forming a capsule, tablet or lozenge. Further, where a liquid vehicle or binder is used, the liquid should be such as to be compatible with both the beta carotene and caffeine and fully capable of releasing the therapeutic ingredients in full potency in the body. Such vehicles or binders are well known to anyone versed in the art of drug compounding. In the case of a tablet, special care must be taken to avoid heat of compression and further care must be taken to prevent oxidation of the carotene.

The following example illustrates a typical composition employing caffeine and beta carotene:

Example 1

| | Mg. |
|---|---|
| Caffeine | 200 |
| Beta carotene providing 50,000 International Units of Vitamin A activity. | |

It has been observed where one having less than normal dark adaptation, when given my improved composition as set forth in the example, the person's dark adaptation returns to normal within hours.

In using the formulation of the example, studies on patients were made using a test procedure which is conducted in darkness. A machine which illuminates a test pattern with a precisely measured amount of light and which is connected to a recorder to record the time and light level simultaneously is provided. If, after a given period of time the patient cannot see the object, i.e., test pattern, the amount of light is gradually increased until the test pattern is identified by the patient. After this light level is determined, further tests determine how quickly one can see again in the dark, i.e., recover rod vision, after dazzling. The person being tested is dazzled by providing a standard amount of light (after the person has become dark adapted) for a period of 60 seconds. The machine then records the time of recovery of rod vision at the predetermined level of rod vision for that person.

The following data from tests conducted on normal subjects four hours or less after taking a capsule containing a placebo, or the formula of the example, and a capsule containing beta carotene alone of the level of the example. The tests were carried out as described above on successive days so as to insure no overlap of medication. Neither the patent nor the technician knew which capsule had been administered. In addition, test patterns were varied at random.

Time needed to identify the test pattern at a light level of 1,000 ml. ($10^2$)

| | |
|---|---|
| With placebo | 27′33″ |
| With test drug | 13′32″ |
| Net gain | 14′01″ |

Smallest amount of light in which there was still rod vision

| | |
|---|---|
| With placebo | 700 ml. ($10^{1.7}$). |
| With test drug | 8.5 ml. ($10^{.8}$). |
| Net gain | 83.3 times. |

Time needed to recover rod vision after dazzle at the lowest level of light at which there was rod vision

| | |
|---|---|
| With placebo | 1′48″. |
| (Light level) | 700 ml. ($10^{1.7}$). |
| With test drug | 1′13″. |
| (Light level) | 8.5 ml. ($10^{.8}$). |
| Net gain | 35″ 1/83rd of the light. |

Test results with the use of beta carotene alone showed no substantial improvement of dark adaptation and dazzle recovery and were substantially the same as the results with the placebo.

Some subjects were tested who had a degree of malfunction due to organic eye disease which affected dark adaptation and dazzle recovery and generally held to be irreversible. Treatment with the composition of the example in some cases showed dramatic and unexpected improvement in dark adaptation.

It is obvious that many variations of proportions may be employed when formulating my improved composition as set forth and illustrated in the examples without departing from the scope of my invention as defined in the appended claims.

I claim:

1. A composition adapted for oral administration for the treatment of night blindness consisting essentially of from 100 to 200 milligrams of caffeine and beta-carotene providing from 10,000 to 100,000 International Units of Vitamin A activity.

2. A method for treating night blindness comprising administering orally a composition consisting essentially of from 100 to 200 milligrams of caffeine and beta-carotene providing from 10,000 to 100,000 International Units of Vitamin A activity.

References Cited

UNITED STATES PATENTS

| 2,816,854 | 12/1957 | Gross | 424—266 |
| 3,193,461 | 7/1965 | Eisen | 424—344 |
| 3,196,078 | 7/1965 | Chatzinoff et al. | 424—344 |

OTHER REFERENCES

Dispensatory of the United States of America, 25th ed., published by J. B. Lippincott Co., Philadelphia, Pa., 1955, pages 895, 896, 1407, and 1408.

RICHARD L. HUFF, Primary Examiner

U.S. Cl. X.R.

424—266, 344